(12) United States Patent
De Saulles

(10) Patent No.: US 10,081,272 B2
(45) Date of Patent: Sep. 25, 2018

(54) METHOD OF POSITIONING A VEHICLE SEAT

(71) Applicant: Ford Global Technologies, LLC, Dearborn, MI (US)

(72) Inventor: Stephen De Saulles, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 15/424,207

(22) Filed: Feb. 3, 2017

(65) Prior Publication Data
US 2017/0225593 A1    Aug. 10, 2017

(30) Foreign Application Priority Data

Feb. 5, 2016 (GB) .................................. 1602154.5

(51) Int. Cl.
*B60N 2/06* (2006.01)
*B60N 2/07* (2006.01)
*B60N 2/14* (2006.01)
*B60N 2/24* (2006.01)

(52) U.S. Cl.
CPC ............... *B60N 2/143* (2013.01); *B60N 2/06* (2013.01); *B60N 2/0745* (2013.01); *B60N 2/24* (2013.01)

(58) Field of Classification Search
CPC ........ B60N 2/06; B60N 2/0745; B60N 2/143; B60N 2/14; B60N 2/0735; B60N 2/0737; B60N 2/062; B60N 2/24
USPC ............................................ 296/65.11, 65.13
See application file for complete search history.

(56) References Cited

U.S. PATENT DOCUMENTS

| 2,822,858 | A | * | 2/1958 | Mussler | B60N 2/14 296/68 |
| 3,394,964 | A | * | 7/1968 | Humphries | B60N 2/143 248/425 |
| 4,341,415 | A | | 7/1982 | Braun et al. | |
| 4,815,785 | A | | 3/1989 | Goodall et al. | |
| 5,028,016 | A | * | 7/1991 | Kelvin | B64D 11/0015 244/122 R |
| 5,067,188 | A | * | 11/1991 | Brantman | A61G 7/103 5/81.1 HS |
| 5,947,541 | A | * | 9/1999 | Behrens | B60N 2/01 296/63 |
| 6,053,569 | A | * | 4/2000 | Flyborg | B60N 2/06 297/238 |
| 7,520,554 | B2 | * | 4/2009 | Brown | B60N 2/06 296/65.01 |
| 2006/0226685 | A1 | * | 10/2006 | Priepke | B60N 2/143 297/344.24 |
| 2008/0290706 | A1 | * | 11/2008 | Yamada | B60N 2/01591 297/240 |

(Continued)

FOREIGN PATENT DOCUMENTS

DE          520825 A       5/1940
EP        0343026 A2      11/1989

*Primary Examiner* — Gregory A Blankenship
(74) *Attorney, Agent, or Firm* — Vichit Chea; Price Heneveld LLP

(57) ABSTRACT

A method of moving a vehicle seat between a forward-facing orientation and a rear-facing orientation includes the steps of: translating the vehicle seat within the vehicle along a track, the track extending in a direction having a component in a lengthwise direction of the vehicle and in a width-wise direction of the vehicle; and rotating the vehicle seat relative to the track.

19 Claims, 7 Drawing Sheets

(56) References Cited

U.S. PATENT DOCUMENTS

| | | | |
|---|---|---|---|
| 2010/0052392 A1 | 3/2010 | Lung et al. | |
| 2013/0193732 A1* | 8/2013 | Brand | B60N 2/14 297/344.21 |
| 2014/0138997 A1* | 5/2014 | Schulz | B60N 2/0244 297/344.24 |
| 2016/0332539 A1* | 11/2016 | Rawlinson | B60N 2/0244 |
| 2017/0028987 A1* | 2/2017 | Yamada | B60W 50/08 |
| 2017/0225593 A1* | 8/2017 | De Saulles | B60N 2/06 |
| 2017/0267124 A1* | 9/2017 | Numazawa | B60N 2/0244 |

\* cited by examiner

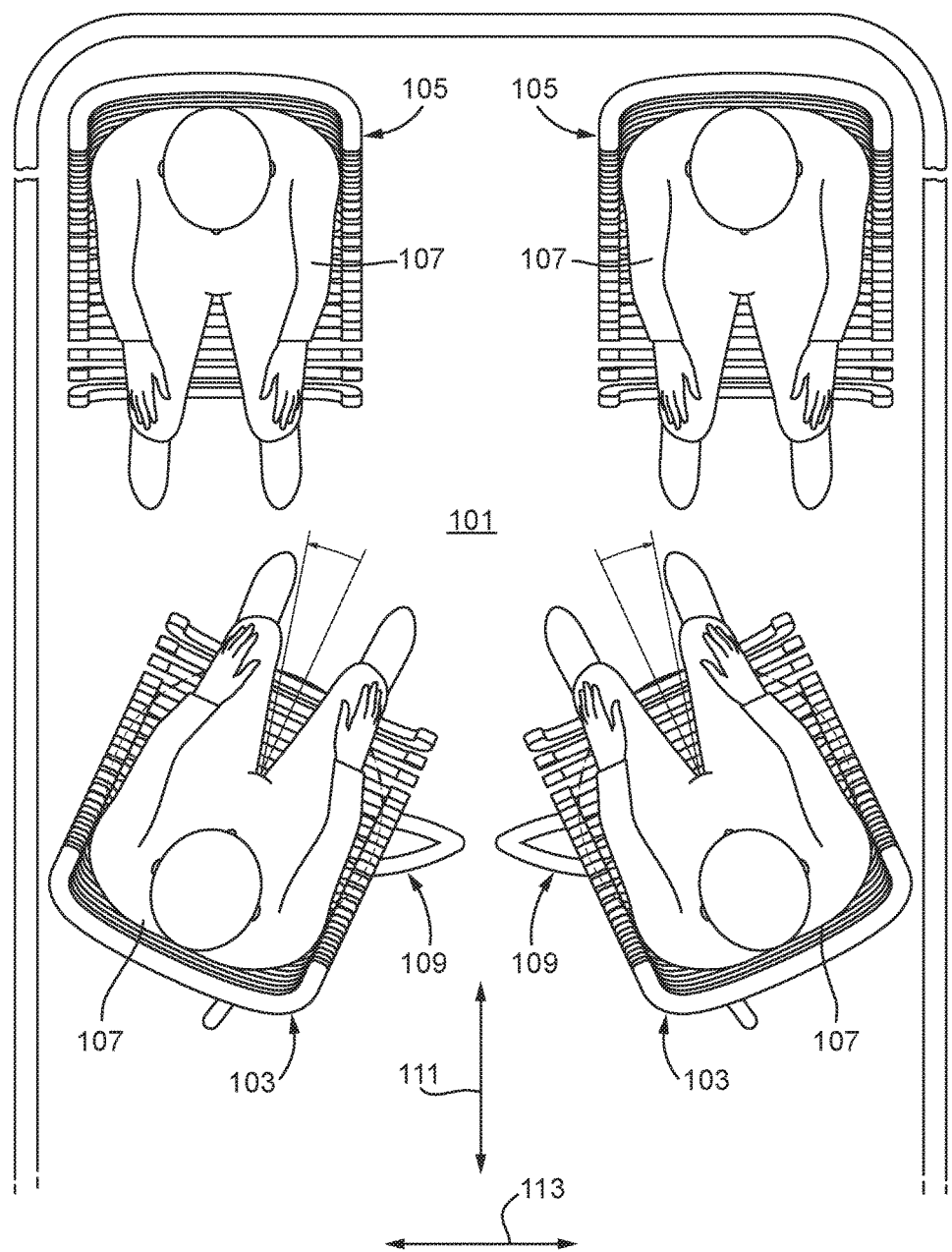

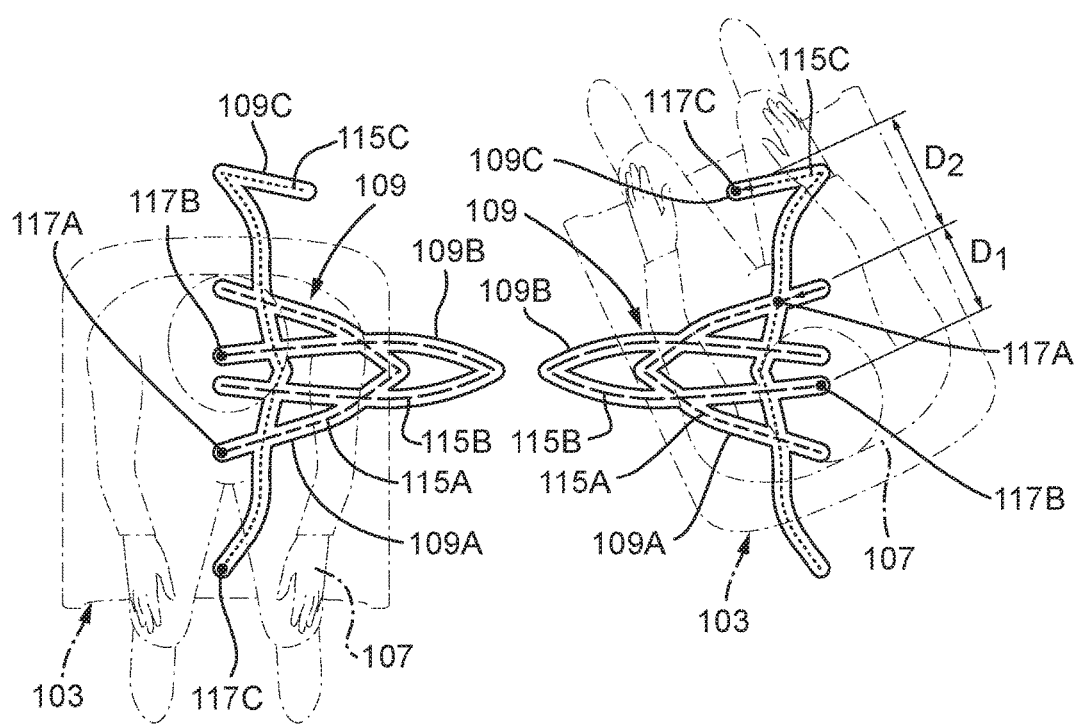

METHOD OF POSITIONING A VEHICLE SEAT

CROSS-REFERENCE TO RELATED APPLICATION

This application claims priority to GB 1602154.5, filed on Feb. 5, 2016, the entire contents of which are hereby incorporated herein by reference.

FIELD OF THE INVENTION

This disclosure relates to a method of moving a vehicle seat between a forward-facing position and a rear-facing position within a vehicle, and in particular, but not exclusively, relates to moving a vehicle seat when an occupant is seated in the vehicle seat.

BACKGROUND OF THE INVENTION

The arrangement of a seat of a vehicle, for example its orientation and position, is usually determined by the purpose of the seat. For example, a driver's seat can be arranged such that a driver of the vehicle is in a forward-facing position behind the controls of the vehicle. Similarly, a passenger seat in the front of a vehicle is usually arranged next to the driver's seat in a forward facing position. In general, the vehicle seats can be configured in a large number of ways according to the desired purpose and category of the vehicle. For example, the vehicle may be a family vehicle, for example a minivan, having multiple rows of passenger seats, where each row is arranged in a forward-facing position. As a result it is difficult for the individuals on different rows to interact with each other. It is desirable, therefore, to be able to arrange the vehicle seats depending on the desired use of the vehicle.

Furthermore, especially with the advent of semi- and fully-autonomous vehicles, it is desirable to be able to change the layout of the vehicle furniture, for example during a journey and/or when the vehicle is moving, to suit the requirements of the individuals using the vehicle on that journey.

It can be difficult, however, to move a seat in a vehicle between different positions and/or orientations owing to the configuration of the vehicle. For example, it can be difficult to turn the vehicle seat between a forward-facing position and a rear-facing position owing to a lack of clearance around the seat when installed in the vehicle.

SUMMARY OF THE INVENTION

According to an aspect of the present disclosure there is provided a method of moving a vehicle seat between a forward-facing orientation and a rear-facing orientation or a side-facing orientation, the method comprising the step of: translating the vehicle seat, for example within the vehicle, along a track, the track extending in a direction having a component in a lengthwise direction of the vehicle and in a width-wise direction of the vehicle. The method may comprise the step of rotating the vehicle seat relative to the vehicle and/or the track.

The step of translating the vehicle seat may occur before, after and/or at the same time as the step of rotating the vehicle seat. The method may comprise any appropriate number of translation steps and/or rotation steps. The steps may be performed in any desired sequence.

The method may comprise simultaneously rotating the vehicle seat and translating the vehicle seat in at least one of the lengthwise direction and the width-wise direction. The method may comprise a step of translating the vehicle seat in the width-wise direction along a width-wise portion of the track. The method may comprise a step of translating the vehicle seat in the lengthwise direction along a lengthwise portion of the track. The track may have a curved portion extending in the lengthwise direction and in the width-wise direction.

The method may comprise simultaneously translating the vehicle seat in the lengthwise direction of a vehicle and in the width-wise direction.

The method may comprise translating the vehicle seat medially towards a longitudinal mid-plane of the vehicle. The method may comprise translating the vehicle seat medially away from a longitudinal mid-plane of the vehicle.

The method may comprise rotating the vehicle seat, for example a front edge of the vehicle seat, away from a longitudinal mid-plane of the vehicle. The method may comprise rotating the vehicle seat, for example a front edge of the vehicle seat, towards a longitudinal mid-plane of the vehicle.

The method may comprise translating the vehicle seat in the lengthwise direction of a vehicle and in the width-wise direction such that the vehicle seat, for example an edge of the vehicle seat, is moved along a curved path, for example along a curved path defined at least in part by an arc, an ellipse and/or a roulette curve, amongst others.

In the context of the present disclosure, the longitudinal axis of the vehicle is orientated such that it extends in the forward-rearward direction, where the front of the vehicle is located at 0° and the rear of the vehicle is located at 180°. The forward-facing orientation may be an orientation where a longitudinal axis of the seat, as viewed from above, is parallel to the longitudinal axis of the vehicle, i.e. an orientation where the vehicle seat is facing directly forwards. The forward-facing orientation may be an orientation where the longitudinal axis of the seat, as viewed from above, is inclined to the longitudinal axis of the vehicle and the vehicle seat is facing towards the front end of the vehicle. The rear-facing orientation may be an orientation where the longitudinal axis of the seat, as viewed from above, is parallel to the longitudinal axis of the vehicle, i.e. an orientation where the vehicle seat is facing directly backwards. The rear-facing orientation may be an orientation where the longitudinal axis of the seat, as viewed from above, is inclined to the longitudinal axis of the vehicle and the vehicle seat is facing towards the rear end of the vehicle. The method may comprise moving the seat between a plurality of discrete forward-facing positions, for example a first forward-facing position and a second forward-facing position. The method may comprise moving the seat between a plurality of discrete rear-facing positions, for example a first rear-facing position and a second rear-facing position.

According to another aspect of the present disclosure there is provided a vehicle seat coupling configured to move a vehicle seat between a forward-facing orientation and a rear-facing orientation, the vehicle seat coupling comprising a track extending in a direction having a component in a lengthwise direction of a vehicle and in a width-wise direction of the vehicle, wherein the vehicle seat coupling is configured to translate the vehicle seat, for example within the vehicle, along the track and rotate the vehicle seat relative to the track.

The vehicle seat coupling may be configured to allow the vehicle seat to be moved between the forward-facing position and the rear-facing position when an occupant is seated in the vehicle seat. The vehicle seat coupling may be configured to allow the vehicle seat to move between a first position, where the vehicle seat is unable to rotate between the forward-facing position and the rear-facing position, and a second position, where the vehicle seat is able to rotate between the forward-facing position and the rear-facing position. For example, in the first position, the vehicle seat may be positioned within the vehicle adjacent to an obstacle that prevents the vehicle seat from rotating between the forward-facing position and the rear-facing position. The obstacle may be a portion of the vehicle body, another vehicle seat, an occupant of the vehicle and/or any other obstacle within the vehicle. The vehicle seat coupling may be configured to translate the vehicle seat away from the obstacle to the second position such that the vehicle seat is able to rotate between the forward-facing position and the rear-facing position The vehicle seat coupling may be configured to translate the vehicle seat, for example a front edge of the vehicle seat, medially towards a longitudinal mid-plane of the vehicle. The vehicle seat coupling may be configured to rotate the vehicle seat, for example a front edge of the vehicle seat, away from a longitudinal mid-plane of the vehicle. The vehicle seat coupling may be configured to translate the vehicle seat, for example a front edge of the vehicle seat, medially away from a longitudinal mid-plane of the vehicle. The vehicle seat coupling may be configured to rotate the vehicle seat, for example a front edge of the vehicle seat, towards a longitudinal mid-plane of the vehicle.

The track of the vehicle seat coupling may be configured to guide one or more support elements of the vehicle seat coupling. The support element may be configured to support the vehicle seat relative to the track within the vehicle.

The vehicle seat coupling may comprise a first track portion and a second track portion configured to guide a first support element and a second support element, respectively. The first support element and the second support element may be spaced apart by a fixed dimension. The first and second tracks may be configured to allow the vehicle seat to translate in the lengthwise direction of a vehicle and in the width-wise direction of the vehicle as the first and second support members rotate relative to each other.

There is also provided a vehicle seat and/or a vehicle comprising at least a portion of one or more of the above mentioned vehicle seat couplings. For example, the vehicle may comprise at least a portion of the track of the vehicle seat coupling and the vehicle seat may comprise at least one support element of the vehicle seat coupling. In this manner, the support element provided on the vehicle seat may be assembled with the track provided on the vehicle to provide the vehicle seat coupling according to the present disclosure.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 3 shows a third arrangement of vehicular seats;
FIGS. 5A to 5D show another configuration of a track of a vehicular seat coupling.

DETAILED DESCRIPTION OF THE PREFERRED EMBODIMENTS

Figure 1:
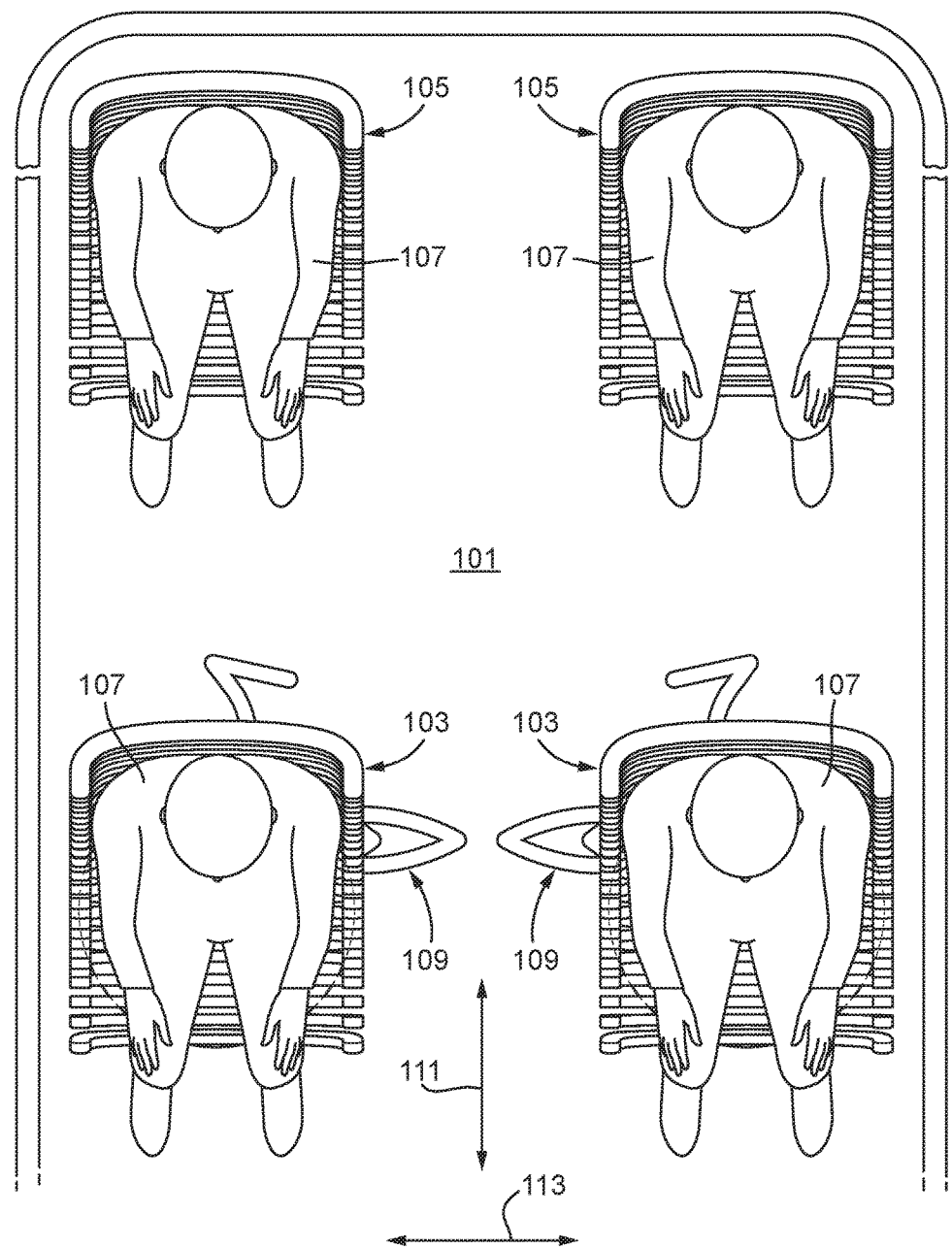
FIG. 1 shows a first arrangement of vehicular seats.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
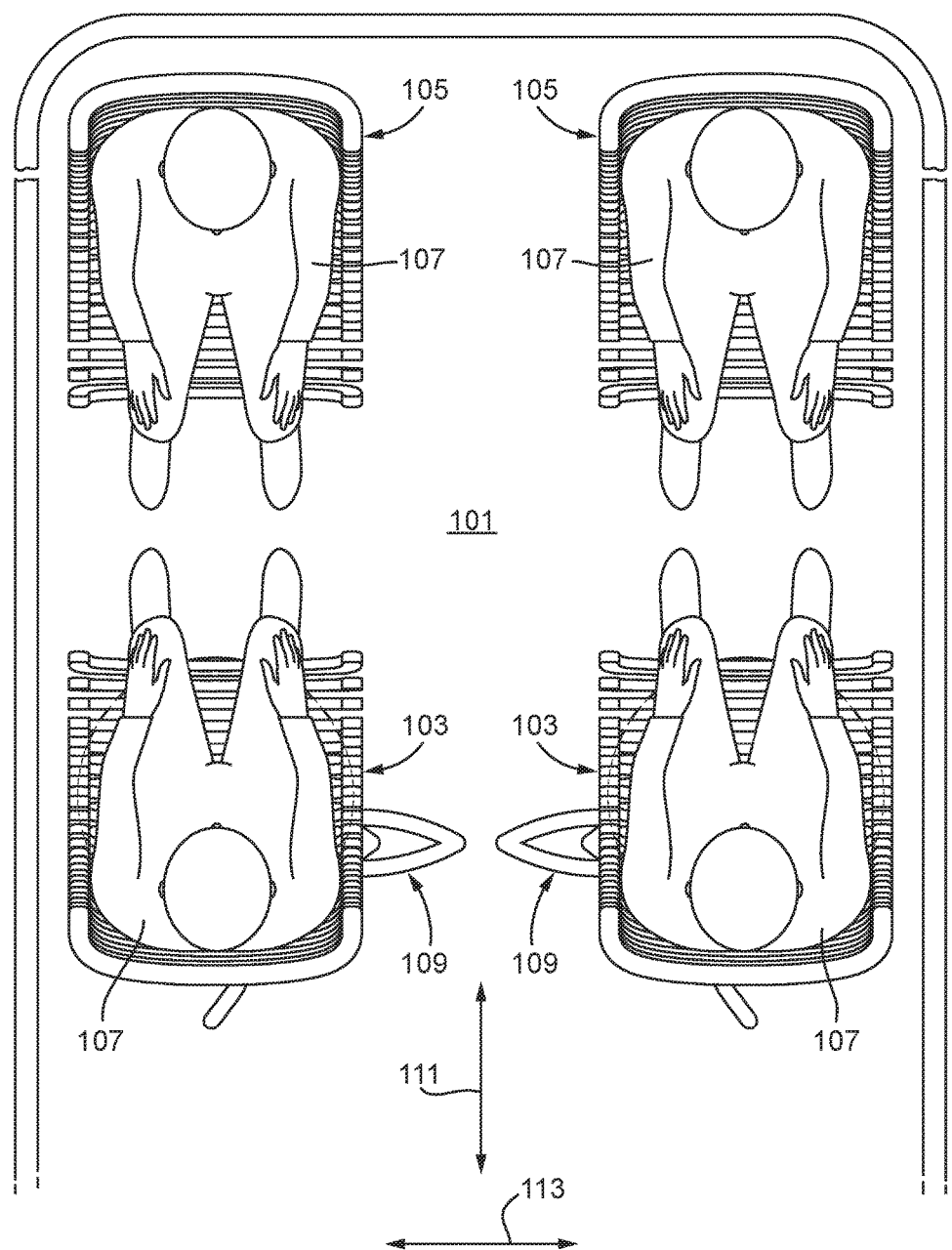
FIG. 2 shows a second arrangement of vehicular seats.

FIGS. 1 to 3 each show the interior of a vehicle 101 that is provided with vehicle seats. In the arrangements shown in FIGS. 1 to 3, the vehicle 101 is a car having front seats 103 and rear seats 105. However, the vehicle 101 may be any appropriate type of vehicle, such as a van, a truck, an eighteen-wheeler, an aircraft, or a water-borne vehicle. The vehicle 101 may have any appropriate number of seats depending on the configuration the vehicle 101. For example, the vehicle 101 may be a minivan or a train carriage having multiple rows of seats. Additionally or alternatively, the vehicle seats may be installed on the exterior of the vehicle 101, for example the vehicle seats may be installed on the deck of a water-borne vehicle. It is understood, however, that the present disclosure is not limited to those configurations shown in FIGS. 1 to 3 and that the vehicle seats may be configured in any appropriate manner according to the configuration of the vehicle 101 to which the vehicle seats are installed.

FIG. 1 shows a first arrangement of the vehicle seats in which the front seats 103 are each configured to seat an occupant, for example a driver 107 or a passenger 10, in a forward-facing position. The rear seats 105 are configured in a similar manner to the front seats 103 such that any passengers that occupy the rear seats 105 are also in a forward-facing position.

FIG. 2 shows a second arrangement of the vehicle seats in which the front seats 103 have been moved so that the front seats 103 are in a rear-facing position. The change between the first arrangement of FIG. 1 and the second arrangement of FIG. 2 is brought about by the action of a vehicle seat coupling configured to couple the front seats 103 to the vehicle 101, such that the front seats 103 can be moved between the forward-facing position and the rear-facing position. Whilst the arrangements shown in FIGS. 1 to 3 show only the front seats 103 moveably coupled to the vehicle, in other arrangements, each of the vehicle seats, for example one or more of the front seats 103 and the rear seats 105, may be moveably coupled to the vehicle 101 by virtue of one or more of the vehicle seat couplings.

Figure 4A:
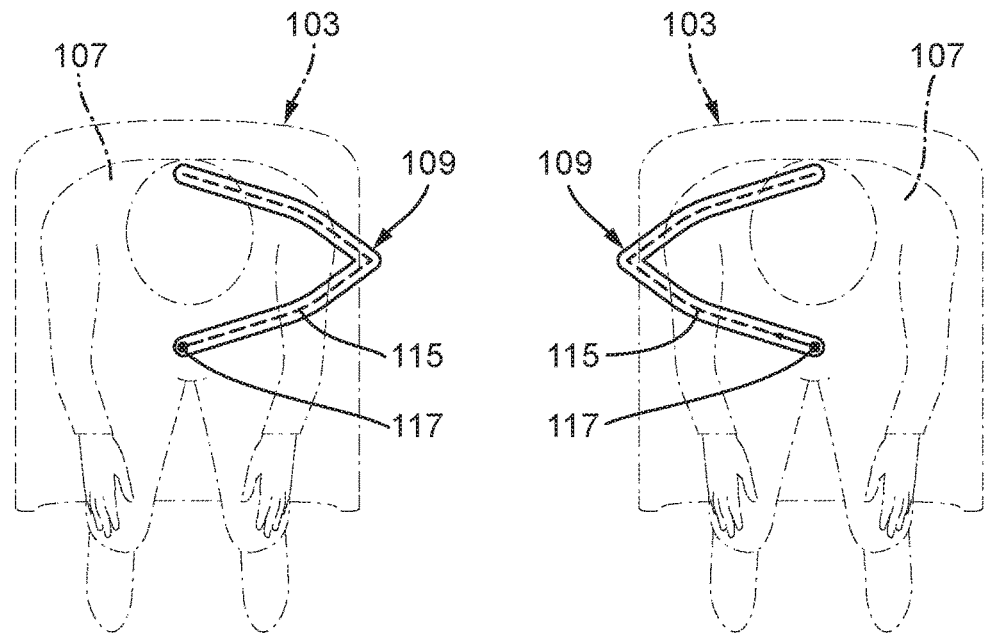
FIGS. 4A to 4C show a configuration of a track of a vehicular seat coupling.
Figure 4B:
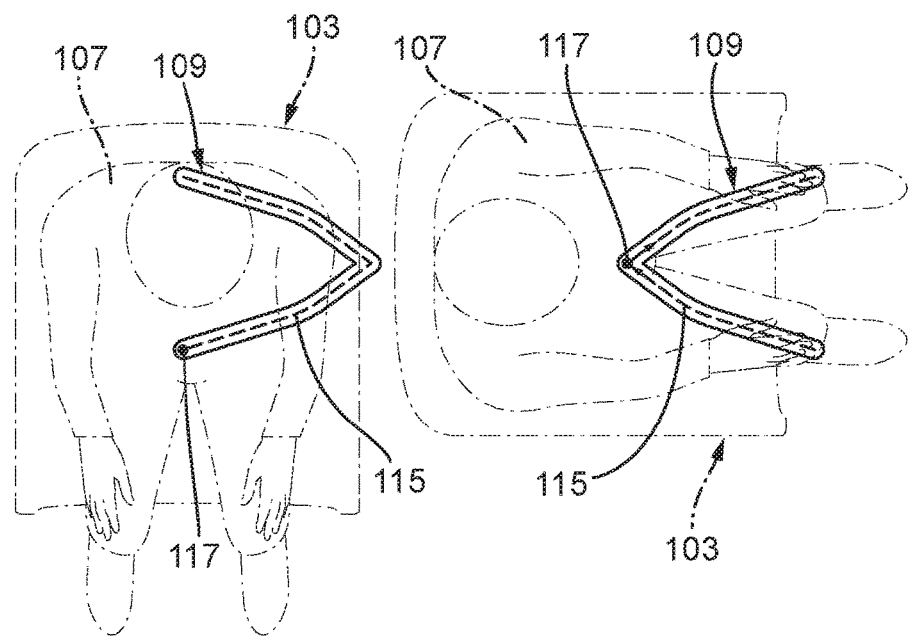
Figure 4C:
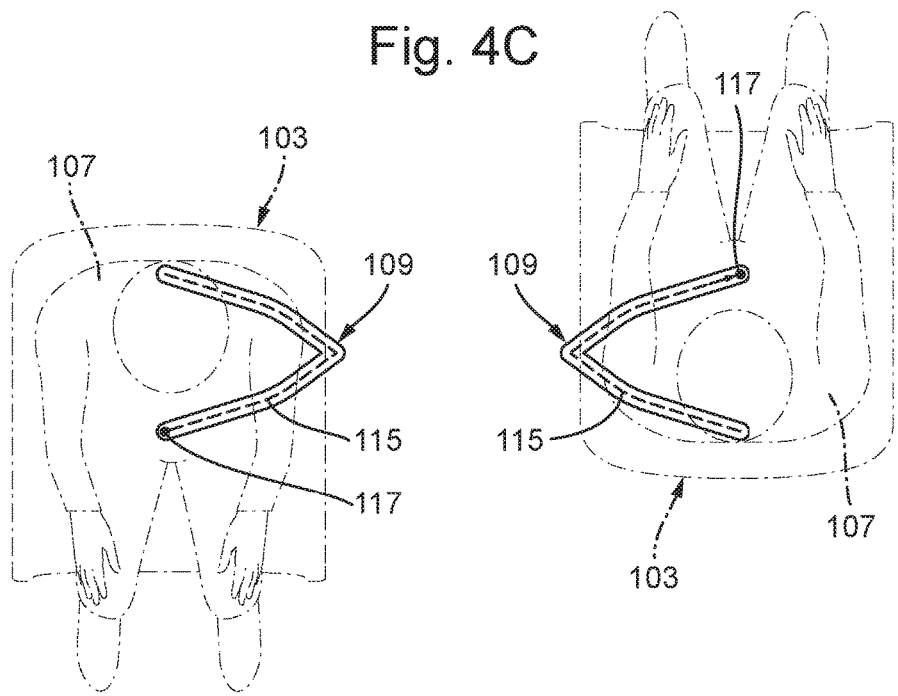

The vehicle seat coupling comprises a track 109 extending in a direction having a component in a lengthwise direction 111 of the vehicle and in a width-wise direction 113 of the vehicle 101. FIGS. 4A to 4C show various arrangements of the track 109, each of which is configured to translate the vehicle seat in the lengthwise direction 111 and the width-wise direction 113. In each of the arrangements shown, the track 109 comprises at least one curved portion such that the track guides the vehicle seat in both the lengthwise direction 111 and the width-wise direction 113 at the same time. In one or more other arrangements, the track 109 may comprise one or more linear portions, for example a linear portion configured to guide the vehicle seat in the lengthwise direction 111 and/or the width-wise direction 113.

The vehicle seat coupling is configured to rotate the vehicle seat relative to the track 109, so that the vehicle seat may be rotated between the forward-facing position and the rear-facing position. In many arrangements, the vehicle seat is positioned within the vehicle 101 such that the vehicle seat is unable to be rotated between the forward-facing position and the rear-facing position as a result of the proximity of the vehicle seat to one or more obstacles in the vehicle. For example, the seats of the vehicle 101 are usually positioned adjacent to the interior side of a door of the vehicle such that there is not enough clearance around the vehicle seat to allow the vehicle seat to be rotated between the forward-facing position and the rear-facing position. However, the movement of the vehicle seat within the vehicle may be restricted by some other obstacle, for example a body portion of the vehicle, a portion of the vehicle controls, another vehicle seat and/or one or more occupants in the vehicle. As such, it is desirable to be able to move the vehicle seat away from the obstacle in order to allow the vehicle seat to be rotated by a desired amount.

In modern vehicles, it is desirable to be able to rearrange the layout of the vehicle seats depending on the required use of the vehicle. For example, a user may wish to reposition one or more of the seats, for example a front seat and/or one or more of a middle row of seats, such that the seat is facing in the rearward direction. In this manner, the occupants of the front and rear seats may be positioned such that they may talk face-to-face. With the advent of semi- or fully-autonomous vehicles, the occupants may wish to rearrange the position of the vehicle seats whilst the vehicle is moving. For example, the driver of a semi-autonomous vehicle may wish to rotate the driver's seat to the rearward direction after engaging an autonomous driving mode. The present disclosure is advantageous as it allows the vehicle seat to be repositioned within the vehicle where an obstacle would otherwise preclude the rotation of the vehicle seat between the forward and rearward facing positions.

The present disclosure provides a method of translating the vehicle seat within the vehicle 101 along the track 109 in the lengthwise direction 111 and the width-wise direction 113, and rotating the vehicle seat relative to the track, such that the vehicle seat may be moved between the forward and rearward facing positions.

In one or more arrangements, the vehicle seat may be positioned within the vehicle such that the seat is able to rotate when there is not an occupant in the vehicle seat, but the seat is unable to rotate when there is an occupant in the vehicle seat. In other words, there may not be enough clearance around the seat to permit the seat to rotate as a result of the occupant's limbs projecting beyond the boundary of the vehicle seat. For example, contact between the occupant's legs and a door of the vehicle may preclude the seat from rotating in the desired manner.

In the arrangements shown in FIGS. 1 to 3, the front seats 103 of the vehicle are translatable towards the longitudinal mid-plane of the vehicle in order to provide sufficient clearance around the seat such that the front seat 103 can be rotated between the forward and rearward facing positions. One of the advantages of such a set-up is that the clearance between the seat and interior side of the vehicle is increased as the seat translates towards the mid-plane of the vehicle 101. Such movement allows the seat to rotate in a direction away from the mid-plane of the vehicle 101, i.e. in a direction towards the vehicle door, which would have otherwise been prevented by the proximity of the vehicle seat to the door. In the arrangements shown in FIGS. 1 to 3, the track 109 is configured such that the track 109 extends towards the mid-plane of the vehicle 101 by a sufficient amount to allow the front seat 103 to rotate when an occupant is using the seat. In this manner, the occupant of the front seat 103 is able to move the front seat 103 between the forward and rearward facing positions whilst they are in the seat, for example whilst the vehicle 101 is in transit.

The method of translating the vehicle seat may comprise the steps of: translating the vehicle seat along a lateral portion of the track 109; translating the vehicle seat along a longitudinal portion of the track 109; and rotating the vehicle seat relative to the track, such that the vehicle seat is moved between the forward and rearward facing positions. It is understood that the method of translating the vehicle seat may comprise any appropriate number of translation steps in the longitudinal and/or the lateral directions, and any appropriate number of rotation steps. The vehicle seat coupling may be configured to perform the steps in any appropriate order depending on the configuration of the vehicle seat and/or the vehicle 101.

More specifically, the method comprises a first step of simultaneously: translating the vehicle seat in the longitudinal direction and in the lateral direction towards the mid-plane of the vehicle 101; and rotating the front of the vehicle seat in a first rotational direction, such that the front of the vehicle seat rotates away from the mid-plane of the vehicle 101. The first step may result in the vehicle seat being moved towards the mid-plane of the vehicle from a first position, for example a position near to a door of the vehicle, to a second position closer to the mid-plane of the vehicle, for example a position far enough from the door of the vehicle 101 to allow the seat to be rotated between the forward and rearward facing positions with an occupant seated in the vehicle seat.

The method comprises a second step of simultaneously: translating the vehicle seat in the longitudinal direction and in the lateral direction away from the mid-plane of the vehicle 101; and continuing to rotate the front of the vehicle seat in the first rotational direction, such that the front of the vehicle seat rotates towards the mid-plane of the vehicle 101. The second step may result in the vehicle seat being moved from the second position back to the first position, or to a third position further from the mid-plane of the vehicle, for example another position nearer to the door of the vehicle 101 than the second position.

The method may result in the vehicle seat having an overall longitudinal displacement when moved from the first position to the third position. For example, the first position may be disposed near to the front of the vehicle, and the third position may be disposed nearer to the rear of the vehicle. Alternatively, the method may result in the vehicle seat having no overall longitudinal displacement, for example when the vehicle seat is moved towards the rear of the vehicle, so that it can be rotated, and is then moved back towards the front of the vehicle.

In a similar manner, the method may result in the vehicle seat having an overall lateral displacement when moved from the first position to the third position. For example, the first position may be disposed at a first distance from the mid-plane of the vehicle, and the third position may be disposed at a second distance to the mid-plane of the vehicle. Alternatively, the method may result in the vehicle seat having no overall lateral displacement.

Referring back to FIG. 3, the method may comprise a step of adjusting the orientation of the vehicle seat once the vehicle seat has been moved between the forward and rearward facing positions. For example, in FIG. 3, the front vehicle seats 105 have been rotated further towards the longitudinal mid-plane of the vehicle 101 such that the front seats 105 are facing slightly towards each other.

As shown in FIGS. 4A to 4C, the track 109 is configured to guide the support element 117 of the vehicle seat towards and away from the mid-plane of the vehicle 101. In order to effect such a movement, the track 109 may comprise one or more slots 115 configured to guide a support element 117 of the vehicle seat coupling. The support element 117, for example a seat base or seat post, may be configured to support the vehicle seat above the track 109 of the vehicle seat coupling. The support element may be slidably and/or rotationally coupled to the track 109 in any appropriate manner, for example the support element 117 may define an axis of rotation of the vehicle seat relative to a portion of the track 109.

In FIG. 4A, the vehicle seat is in a first position where the occupant of the vehicle seat is facing towards the front of the vehicle. In FIG. 4B, the vehicle seat has translated along the track 109 to a second position where the occupant of the vehicle seat is facing away from the mid-plane of the vehicle 101, for example a position facing towards a door of the vehicle 101. In the second position shown in FIG. 4B, there is enough clearance around the vehicle seat when the occupant is seated be able to rotate the vehicle seat between the forward and rearward facing positions. In FIG. 4C, the vehicle seat has translated along the track 109 to a third position where the occupant of the vehicle seat is facing towards the rear of the vehicle 101. In the arrangement shown in FIGS. 4A to 4C, the vehicle seat is rotatable around the rotational axis of the support element 117.

The support element 117 may be free to slide along the track 109 such that the vehicle seat translates in the longitudinal and lateral directions. The support element 117 may be free to rotate such that the vehicle seat can occupy any rotational position at any point along the track 109. Alternatively, the translational and rotational positions of the support element relative to the track 109 may be linked such that the translational position is a function of the rotational position, and vice versa. For example, the vehicle seat coupling may comprise one or more linear actuators configured to move the vehicle seat along the track 109. The vehicle seat coupling may comprise one or more rotational actuators configured to rotate the vehicle seat relative to the track 109. The linear and rotational actuators may be operatively connected such that movement of one of the linear actuator and the rotational actuator results in the movement of the other of the linear actuator and the rotational actuator. The operative connection may be a mechanical linkage that couples the translational and rotational motion such that the seat can be moved using a single actuator, and/or by the occupant of the seat. Alternatively, the operative connection may comprise a plurality of actuators that are controlled by a controller of the vehicle seat coupling.

In one arrangement, the vehicle seat coupling may comprise a gear set configured to connect operatively the translational and/or the rotational movement of the vehicle seat. The first gear may be fixed relative to the vehicle seat coupling, the second gear being moveable with respect to the first gear, such that path drawn by the rotational axis, or a point eccentric to the rotational axis, of the second gear defines the shape of the track 109 as the second gear rotates relative to the first gear. The support element 117 of the vehicle seat coupling may be coupled to the second gear such that rotation of the second gear relative to the first gear results in the longitudinal translation, the lateral translation and the rotation of the vehicle seat as the second gear rotates relative to the first gear. The gear set may be driven by one or more actuators, for example a stepper motor.

FIGS. 5A to 5D show another arrangement of the track 109 having first a track portion 109A, a second track portion 109B and a third track portion 109C. Although the track 109, of FIGS. 4A to 4C, and the first track portion 109A, of FIGS. 5A to 5D, are shown to be similar in form, it is understood that the track portion 109A shown in FIGS. 5A to 5D may be different from the track 109 shown in FIGS. 4A to 4C. In the arrangement shown in FIGS. 5A to 5D, each of the track portions 109A, 109B, 109C comprises a respective slot 115A, 115B, 115C and each is configured to guide a respective support element 117A, 117B, 117C of the vehicle seat coupling. The support elements 117A, 117B, 117C are spaced apart from each other in a linear manner. The support elements 117A, 117B, 117C may, however, be arranged in any appropriate manner depending on the configuration of the vehicle seat and/or the vehicle 101.

In the arrangement of FIGS. 5A to 5D, the second support element 117B is spaced apart from the first support element 117A by a first distance D1, and the third support element 117C is spaced apart from the first support element 117A by a second distance D2. The first, second and third track portions 109A, 109B and 109C are configured to allow the vehicle seat coupling to translate in the lengthwise direction 111 of the vehicle 101 and in the width-wise direction 113 of the vehicle 101 as the first, second and third support elements 117A, 117B, 117C rotate relative to one another. For example, the curvature of the first and second track portions 109A, 109B is such that the spatial relationship between the first track portion 109A and the second track portion 109B is a function of the rotational position of the vehicle seat and the spacing D1 between the first and second support elements 117A, 117B. In other words, at a first rotational position of the vehicle seat the spacing between the first track portion 109A and the second track portion 109B matches the spacing D1 between the first and second support elements 117A, 117B. Similarly, at a second rotational position of the vehicle seat the spacing between the first track portion 109A and the second track portion 109B also matches the spacing D1 between the first and second support elements 117A, 117B.

In a similar manner, the spatial relationship between the first track portion 109A and the third track portion 109C is a function of the rotational position of the vehicle seat and the spacing D2 between the first and third support elements 117A, 117C. In other words, at the said first rotational position of the vehicle seat the spacing between the first track portion 109A and the third track portion 109C matches the spacing D2 between the first and third support elements 117A, 117C. Similarly, at the said second rotational position of the vehicle seat the spacing between the first track portion 109A and the third track portion 109C also matches the spacing D2 between the first and third support elements 117A, 117C.

As a result of the spatial arrangement of the track portions 109A, 109B, 109C, each of the support elements 117A, 117B, 117C are allowed to move along the respective slots 115A, 115B, 115C without jamming as the vehicle seat translates in the lengthwise and width-wise directions 111, 113 and as the vehicle seat rotates relative to the track portions 109A, 109B and 109C.

Figure 5A:
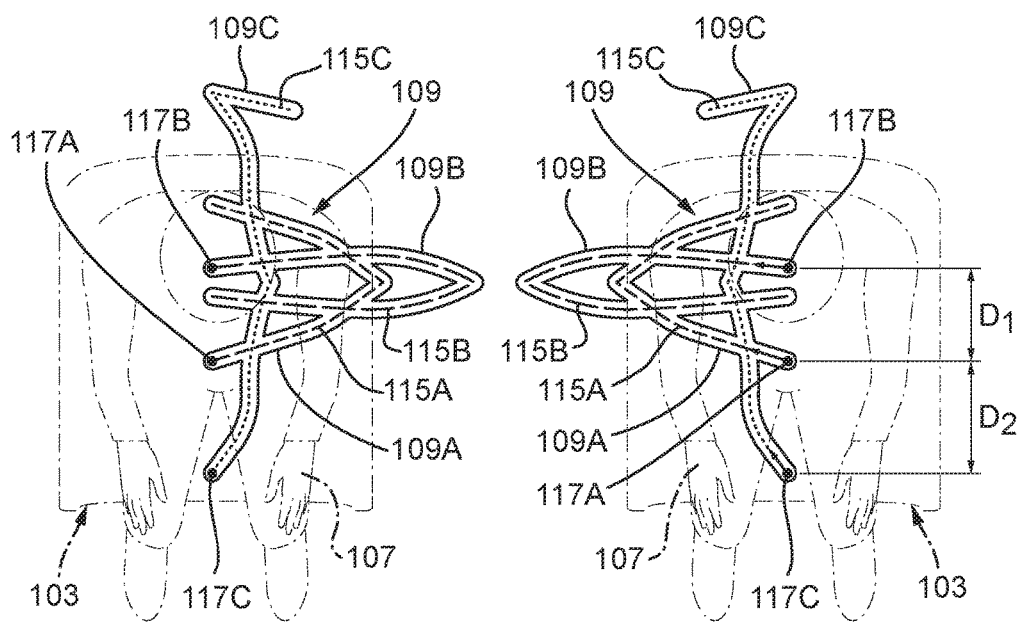
Figure 5B:
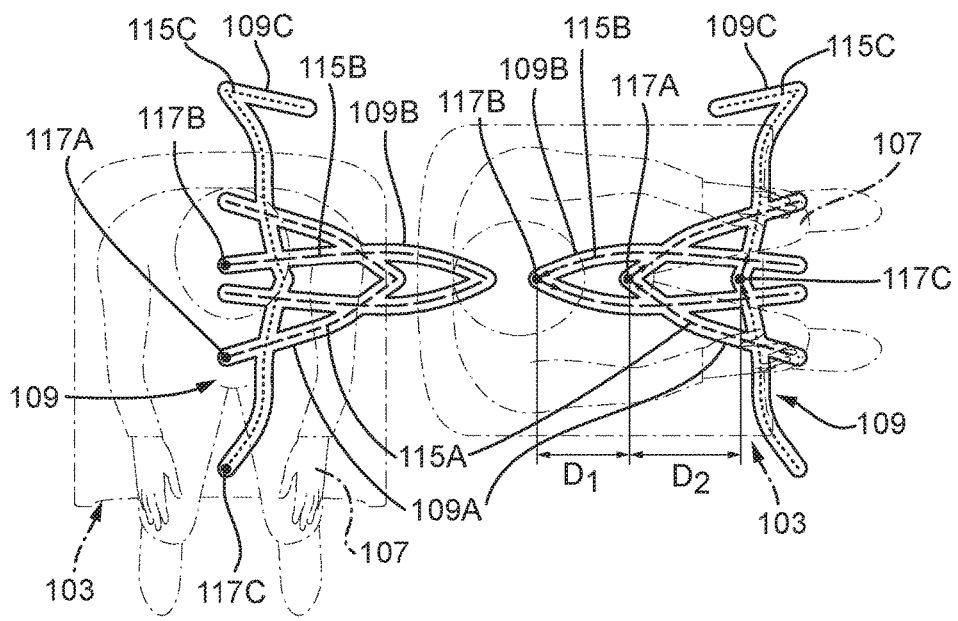
Figure 5C:
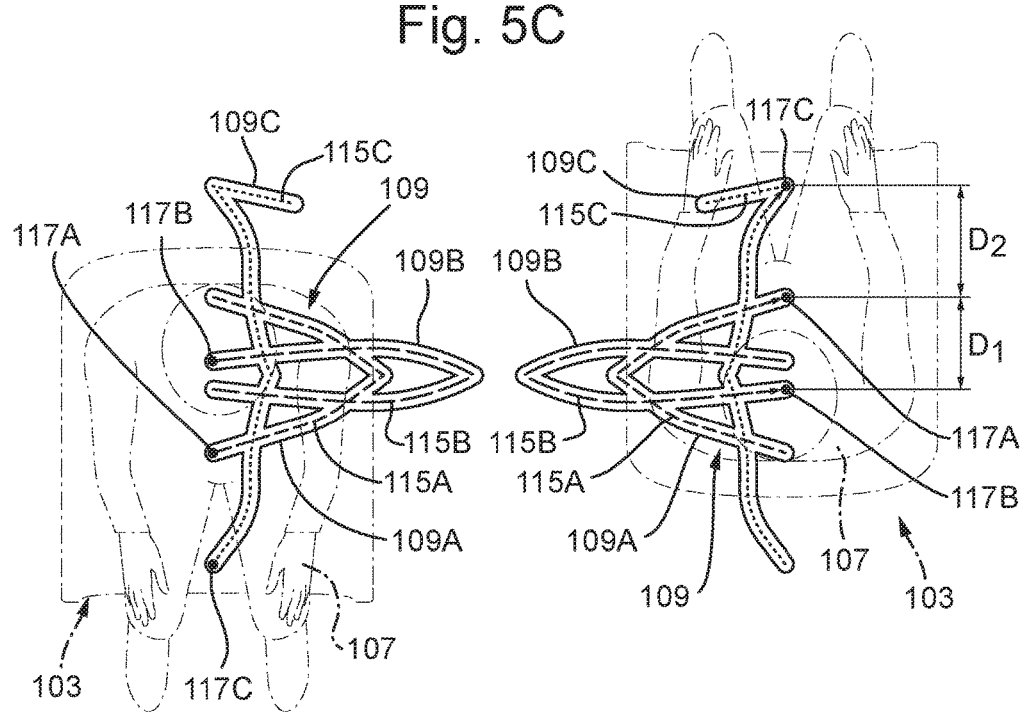

In FIG. 5A, the vehicle seat is in a first position where the occupant of the vehicle seat is facing towards the front of the vehicle. In FIG. 5B, the vehicle seat has translated along the track portions 109A, 109B and 109C to a second position where the occupant of the vehicle seat is facing away from the mid-plane of the vehicle 101, for example a position facing towards a door of the vehicle 101. Movement of the vehicle seat to the second position from the first position is effected by the translation of the support members 117A, 117B, 117C along the respective slots 115A, 115B, and 115C. In the second position shown in FIG. 5B, there is enough clearance around the vehicle seat when the occupant is seated be able to rotate the vehicle seat between the forward and rearward facing positions. In FIG. 5C, the vehicle seat has translated along the track portions 109A, 109B and 109C to a third position where the occupant of the vehicle seat is facing towards the rear of the vehicle 101. Movement of the vehicle seat to the third position from the second position is effected by the translation of the support elements 117A, 117B, 117C along the respective slots 115A, 115B, and 115C.

In FIG. 5D, the vehicle seat has translated along the second and third track portions 109B and 109C to a fourth position where the occupant of the vehicle seat is facing towards the mid-plane of the vehicle 101, for example a position where the occupant of the vehicle seat is facing towards another occupant on the other side of the vehicle 101. Movement of the vehicle seat between the third position and the fourth position is effected by the translation of the first and third support elements 117A, 117C along the respective slots 115A, 115C. In other words, the vehicle seat has rotated about an axis defined by the rotational axis of the second support element 117B. It is understood however, that the movement of the vehicle seat is not limited to the arrangements shown in FIGS. 4A to 4C and FIGS. 5A to 5D, and that the vehicle seat may be moved in any appropriate manner. Indeed, movement of the vehicle seat may be effected by the translation and/or rotation of the vehicle seat in any degree of freedom.

It will be appreciated by those skilled in the art that although the invention has been described by way of example with reference to one or more examples, it is not limited to the disclosed examples and that alternative examples could be constructed without departing from the scope of the invention as defined by the appended claims.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of moving a vehicle seat, the method comprising the steps of:
   providing a vehicle seat mounted to a track by a vehicle seat coupling within a vehicle interior, wherein the track includes a first portion angled towards a mid plane of the vehicle interior in a first direction, and a second portion angled away from the mid plane of the vehicle interior in a second direction;
   translating the vehicle seat along the first portion of the track in a lengthwise direction of the vehicle and in a width-wise direction of the vehicle from a first position to a second position;
   translating the vehicle seat along the second portion of the track in a lengthwise direction of the vehicle and in a width-wise direction of the vehicle from the second position to a third position, wherein the first position defines a first end of the track, and further wherein the third position defines a second end of the track;
   rotating the vehicle seat on the vehicle seat coupling from a first orientation to a second orientation relative to the track, wherein the second orientation is an opposed orientation relative to the first orientation.

2. The method according to claim 1, wherein the first orientation defines a forward-facing orientation, and the second orientation defines a rear-facing orientation.

3. The method according to claim 1, wherein the steps of translating the vehicle seat and rotating the vehicle seat on the vehicle seat coupling occur simultaneously.

4. The method according to claim 1, wherein the vehicle seat is rotatable relative to the track along any portion of the track.

5. The method according to claim 1, wherein the vehicle seat is rotatable only when the vehicle seat is located at the second position.

6. The method according to claim 1, wherein the step of rotating the vehicle seat on the vehicle seat coupling includes rotating the vehicle seat away from the mid plane of the vehicle interior.

7. The method according to claim 1, wherein the track is a non-linear track.

8. A vehicle seat coupling, comprising:
a track having first and second portions extending in both a lengthwise direction of a vehicle and a width-wise direction of the vehicle, the first and second portions configured in opposed configurations, wherein the first portion of the track translates the vehicle seat towards a longitudinal axis of the vehicle, and further wherein the second portion of the track translates the vehicle seat away from the longitudinal axis of the vehicle;
a support element rotatably and slideably received in the track; and
a vehicle seat supported on the support element and configured to translate along the track and rotate relative to the track.

9. The vehicle seat coupling according to claim 8, wherein the vehicle seat coupling is rotates the vehicle seat between a forward-facing position and a rear-facing position when an occupant is seated in the vehicle seat.

10. The vehicle seat coupling according to claim 8, wherein the vehicle seat coupling rotates the vehicle seat in a direction that is directed away from a longitudinal axis of the vehicle.

11. The vehicle seat coupling according to claim 8, wherein the support element includes, first and second support elements operably coupled between the vehicle seat and the track, wherein the first and second support elements are guided by the track as the vehicle seat is moved.

12. The vehicle seat coupling according to claim 11, wherein the track includes first and second tracks, and further wherein the first support element is received within the first track, and further wherein the second support element is received within the second tack.

13. The vehicle seat coupling according to claim 12, wherein the first support element and the second support element are spaced-apart by a fixed dimension.

14. The vehicle seat coupling according to claim 13, wherein the first portions of the first and second tracks are configured in the lengthwise direction of the vehicle and in the width-wise direction of the vehicle towards a longitudinal axis of the vehicle.

15. The vehicle seat coupling according to claim 14, wherein the first and second support elements rotate relative to each other as the first and second support elements move along the first and second tracks.

16. A vehicle seat coupling, comprising:
first, second and third intersecting tracks extending in both lengthwise and width-wise directions of a vehicle; and
a vehicle seat moveably supported on the tracks by first, second and third support elements configured to translate along the tracks and rotate relative to the tracks, wherein the first, second and third support elements are respectively received in the first, second and third tracks.

17. The vehicle seat coupling according to claim 16, wherein the first track, the second track and the third track are non-linear tracks.

18. The vehicle seat coupling according to claim 17, wherein the first support element is slideably and rotatably received within the first track, and further wherein the second support element is slideably and rotatably received within the second track, and further wherein the third support element is slideably and rotatably received within the third track.

19. The vehicle seat coupling according to claim 18, wherein the first support element, the second support element and the third support element are spaced-apart from each other by a fixed dimension, and further wherein as the first support element, the second support element and the third support element rotate relative to each other as the vehicle seat moves along the tracks.

\* \* \* \* \*